March 19, 1929.  J. L. SHROYER  1,706,190
COFFEE MAKING APPARATUS
Filed April 29, 1924
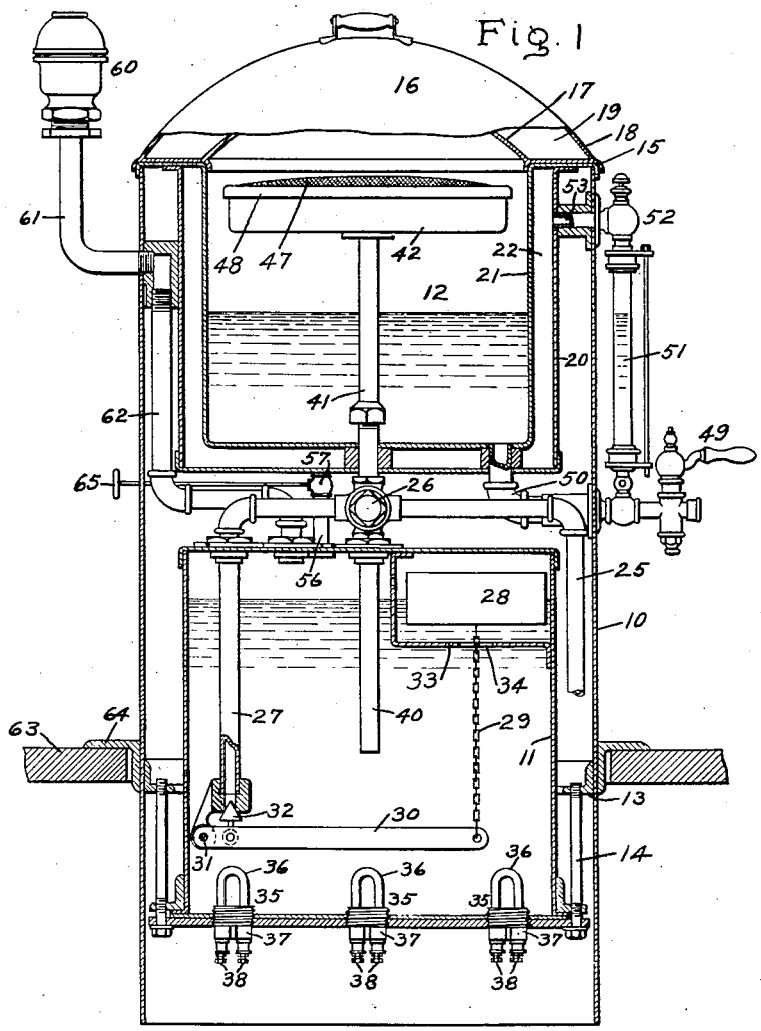
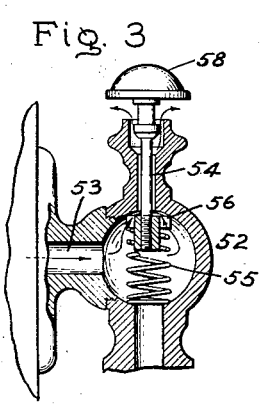
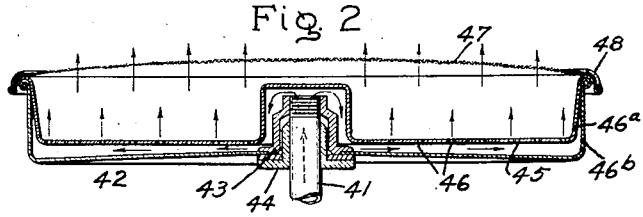
Inventor
Jacob L. Shroyer
by
His Attorney Patented Mar. 19, 1929.

1,706,190

UNITED STATES PATENT OFFICE.

JACOB L. SHROYER, OF OAK PARK, ILLINOIS, ASSIGNOR TO EDISON ELECTRIC APPLIANCE CO. INC., OF CHICAGO, ILLINOIS, A CORPORATION OF NEW YORK.

COFFEE-MAKING APPARATUS.

Application filed April 29, 1924. Serial No. 709,891.

My invention relates to coffee making apparatus and has for its object an improved construction and arrangement of apparatus for making coffee and the provision of means whereby the coffee may be stirred and reheated.

Although not limited thereto, my invention relates more particularly to heavy duty coffee urns or apparatus such as may be used in hotels and restaurants for making coffee. In accordance with my invention, I place the hot water tank below the coffee tank and force the hot water upward by steam pressure into the coffee tank and through the ground coffee in an upward direction. I also provide means whereby the steam may be utilized to stir and reheat the coffee.

For a more complete understanding of my invention reference should be had to the accompanying drawing in which Fig. 1 is a sectional view in elevation of a coffee urn embodying my invention; Fig. 2 is a sectional view in elevation of the container for the coffee grounds; while Fig. 3 is a sectional view of a steam valve.

Referring to the drawing, I have shown my invention in one form as embodying a vertically disposed, cylindrical casing or containing shell 10 in the lower part of which is secured a hot water tank 11 and in the upper part a tank 12 for the prepared coffee. The tank 11 may be supported or hung on a flange 13, secured to the casing 10, by means of suitable supporting bolts 14 spaced at intervals around it. The coffee tank 12 is open at the top and as shown has its upper edge provided with a flange 15 which rests on the upper end of the casing 10 so as to support the tank. A cover 16 fits on the top of the casing 10 closing the tank 12. This cover preferably is provided with an inner jacket 17 between which and the outer wall 18 is a sealed dead air space 19 which provides heat insulation. Obviously the space 19 may be filled with a suitable heat insulating material or it may constitute a vacuum. The tank 12 is provided with an outer wall 20 between which and the inner wall 21 is a steam space 22 surrounding the sides and the bottom of the tank. As shown, the outer wall 20 of tank 12 and the tank 11 have substantially the same diameter which is somewhat smaller than the diameter of the casing 10, and the tanks are supported in concentric relation with the casing 10 whereby a space is provided around the tanks for heat insulation. This space may be filled with a suitable heat insulating material (not shown).

Cold water is admitted to the tank 11 through a pipe 25 from a suitable source of supply, such as a city water main. The water is led from pipe 25 through a two-way valve 26 and thence through a pipe 27 downward into the tank 11, the outlet of the pipe 27 being near the bottom of the tank. The admission of water to the tank is automatically controlled by means of a float 28 which is connected by a chain 29 to a lever 30 having a pivot 31 on or adjacent the end of the pipe 27. This lever 30 operates a valve 32 under the control of the float 28 to close the orifice of the pipe 27 and shut off the water supply when the water reaches a predetermined level, as shown in the drawing. Preferably, a partition 33 is provided around the float to hold it in a definite position laterally and to support the float when the tank is empty, the float having sufficient freedom in a vertical direction to open and close the valve. An aperture 34 is provided in the partition through which the chain 29 extends and the water has access to the float. Suitable heating means is provided for the tank 11, electric heaters 35 being shown. These heaters may be of any suitable type and may consist of helical coil sheathed wire heating units 36 such as shown for example in Patent No. 1,367,341 to Abbott, dated February 1, 1921. The ends of the heating units 36 are brought out through plugs 37, which are screwed into the bottom of the tank, and provided with terminals 38 for connection with a suitable source of electrical supply.

Hot water from the tank 11 is forced by the pressure of steam generated in the tank upward through an outlet pipe 40, valve 26, and thence through a pipe 41 into the coffee tank 12 and upward through the coffee grounds container 42 which is placed near the top of the tank 12. The valve 26 is a two-way valve of well known construction such that when it is turned to admit cold water through the pipe 25, the hot water outlet through pipe 40 is shut off and when it is turned to permit the escape of hot water through pipe 40 the admission of cold water through pipe 25 is shut off.

The container 42 for the ground coffee may be conveniently supported on the upper end of the pipe 41. As shown in Fig. 2, in order to make the connection with the pipe 41 more secure, the pipe 41 is extended through the bottom of the container for a short distance and is then secured by a screw thread connection to a collar 43 which is secured to the bottom of the container. A second collar 44 fitting closely around the pipe extends into the collar 43 and is secured to the outside of the bottom of the container. A false bottom 45 is provided in the ground coffee container. This false bottom is shown as forming the bottom of an inner nested receptacle 46ª the upper edge of which is bent over and rests on the edge of an outer receptacle 46ᵇ forming a water tight joint therewith. Obviously, the two receptacles may be easily taken apart for cleaning purposes. In the false bottom are provided perforations 46 at regular intervals through which the hot water is forced in an upward direction. It will be obvious that the water entering through the pipe 41 is distributed in the space between the two bottom walls of the container, forced upward through the perforations 46 and the ground coffee which is put in the inner receptacle 46ª, and caused to overflow from the container into the tank 12. A finely perforated cover 47, which may be a fabric, is provided for the container to prevent the escape of the ground coffee with the water. This cover is secured in place by means of a clamping ring 48 slipped over the upper edge of the container. The prepared coffee may be withdrawn through a suitable faucet 49 which communicates with the tank 12 at the bottom thereof through a pipe 50.

A glass coffee level indicator tube 51 is provided on the exterior of the casing 10. It communicates at its lower end with the pipe 50. The upper end of the water lever indicator communicates through a valve 52 with the outside air as does also the chamber 22 through a pipe 53 connected to the valve 52. As shown in Fig. 3, the valve 52 comprises a valve stem 54 which is normally forced upward by means of a spring 55 so that a fluted nut 56 on its lower end is held seated against the inner wall of the valve. In this position of the valve stem 54, the valve is opened so as to allow free access from the pipe 53 and the coffee level indicator glass 51 to the outside air.

For the purpose of heating the coffee in the container 12, steam may be admitted from the hot water tank 11 through a pipe 56 and a control valve 57 into the chamber 22. This steam normally escapes freely through the pipe 53 and valve 52, but by depressing the valve stem 54, which is provided with a knob 58 for this purpose, the valve 52 may be closed whereby the steam from the chamber 22 is caused to pass downward through the coffee level indicator tube 51 and the pipe 50 into the coffee tank 12 and upward through the prepared coffee. In this manner the prepared coffee may be stirred. This stirring of the coffee is very desirable, since I have found that there is a tendency for the prepared coffee at the bottom and top of the tank to be of different strengths. When it is desired to simply reheat the previously prepared coffee, the valve 57 is opened and steam admitted to the chamber 22 and allowed to escape through valve 52.

A steam pressure gauge 60 of any suitable type is provided for the tank 11. This gauge is connected to the tank through pipes 61 and 62.

The coffee urn may be conveniently set in an aperture in a table or counter 63 and supported on a flange 64 which is secured to the outer casing 10.

The valve 57 may be opened and closed by means of a knob 65 on the exterior of the casing 10. A similar operating knob (not shown) is provided for valves 26.

In the operation of the urn, the valve 26 is first turned to admit cold water to the tank 11, the water supply being automatically cut off by the float at a predetermined level. The automatic cut-off is adjusted so that the tank is not completely filled, a steam space being left at the top. The valve 26 is then turned to admit hot water to the coffee tank, this shutting off the cold water supply, and the water heated by the heating units 35. When sufficient steam pressure has been generated, hot water is forced upward by the steam pressure through the ground coffee container, as previously described. The making of the coffee thus proceeds until the desired quantity has been made as indicated by the coffee gauge. Valve 57 will then be opened and button 58 depressed whereby steam is passed through the coffee to stir it thoroughly. Thereupon valve 26 will be turned to shut off the hot water supply whereby cold water is admitted to the tank 41 and the tank refilled ready for the preparation of another batch of coffee.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. Coffee making apparatus comprising a hot water tank, a coffee tank, a steam connection between said hot water tank and said coffee tank, a liquid level indicating device in said connection, and means cooperating with said indicating device for passing steam from said hot water tank into said coffee tank so as to stir the coffee.

2. Coffee making apparatus comprising a hot water tank, a coffee tank, a steam connection including a liquid level indicating device between said hot water tank and the bottom of said coffee tank and a manually operated valve cooperating with said indicating device for admitting steam to said coffee tank to stir the coffee.

3. Coffee making apparatus comprising a hot water tank, a coffee tank, a ground coffee container in said coffee tank, means for passing hot water from said hot water tank through said container to make the coffee, a connection between said hot water tank and said coffee tank, a liquid level indicating tube forming part of said connection, and means cooperating with said tube for passing steam through the coffee to stir it.

4. Coffee making apparatus comprising a hot water tank, a coffee tank, a steam chamber around said coffee tank, a ground coffee container in said coffee tank, means for passing hot water from said hot water tank through said coffee container to make the coffee, means for admitting steam from said hot water tank into said steam chamber to heat the coffee, and means for passing steam through the coffee to stir it.

5. Coffee making apparatus comprising a hot water tank, a coffee tank, an outer wall forming a steam chamber around said coffee tank, means for admitting steam from said hot water tank to said chamber to heat the coffee, and means for passing steam from said chamber into the coffee tank at the bottom whereupon the steam passes upward through the coffee stirring it.

6. Coffee making apparatus comprising a hot water tank, a coffee tank, an outer wall forming steam chamber around said coffee tank, means for admitting steam from said hot water tank to said chamber, a coffee level indicator tube connected to said coffee tank at the bottom, a common outlet to the air for said steam chamber and said coffee level indicator tube, and a normally open valve in said outlet whereby when said valve is closed said steam chamber is connected to said coffee level indicator tube and steam forced through the coffee in the coffee tank stirring it.

7. Coffee making apparatus comprising a hot water tank, a coffee tank, a ground coffee container in said coffee tank, a cold water inlet pipe for said hot water tank, a hot water outlet pipe for passing hot water from said hot water tank through said ground coffee container into said coffee tank, and a common valve for said cold water inlet and hot water outlet pipes arranged to close one when the other is opened.

8. Coffee making apparatus comprising a container for the ground coffee, a false bottom in said container provided with perforations, a hot water inlet in the bottom of said container through which hot water is forced in an upward direction through said perforations and the ground coffee, and a perforated cover for said container through which the prepared coffee escapes.

9. Coffee making apparatus comprising a container for the ground coffee formed by two nested receptacles having their bottoms spaced apart, the inner receptacle being provided with perforations, and a hot water inlet in the bottom of the outer receptacle through which hot water is forced in an upward direction through said perforations and into the ground coffee, and a perforated cover for said container through which the prepared coffee escapes.

10. Coffee making apparatus comprising a container for the ground coffee, a false bottom in said container provided with apertures, a hot water inlet in the bottom of said container through which hot water is forced upwardly through said apertures and the ground coffee, a fabric top for said container, and a clamping ring fitting over the edge of said container and securing the fabric cover in place.

11. Coffee making apparatus comprising a coffee tank, a hot water tank underneath said coffee tank, heating means associated with said hot water tank, a pipe connecting said tanks through which hot water is forced upwardly by steam pressure into said coffee tank, and a ground coffee container in said coffee tank, mounted on said hot water pipe and communicating therewith.

12. Coffee making apparatus comprising a coffee tank, a hot water tank below said coffee tank, a pipe connecting said tanks through which hot water is forced upwardly by steam pressure into said coffee tank, an outer receptacle mounted on the upper end of said pipe and communicating therewith, and an inner receptacle for the ground coffee fitting tightly in said outer receptacle, said inner receptacle having a perforated bottom spaced from the bottom of said outer receptacle.

13. Coffee making apparatus comprising a coffee tank, a hot water tank underneath said coffee tank, heating means associated with said hot water tank, a hot water pipe connecting said tanks through which hot water is forced upwardly by steam pressure into said coffee tank, a ground coffee container in said coffee tank mounted on the upper end of said hot water pipe, a cold water inlet pipe for said hot water tank, and a two-way valve in said pipes arranged to close one when the other is opened.

In witness whereof, I have hereunto set my hand this 21 day of April, 1924.

JACOB L. SHROYER.